United States Patent Office 2,997,401
Patented Aug. 22, 1961

2,997,401
DIELECTRIC CONSTANT OF GLASSES CONTAINING TITANIUM IONS
Willard E. Hauth, Jr., Hatboro, and Bhogaraju V. Janakirama-Rao, Philadelphia, Pa., assignors to International Resistance Company, Philadelphia, Pa.
No Drawing. Filed Feb. 27, 1958, Ser. No. 717,818
6 Claims. (Cl. 106—53)

This invention relates to a method for increasing the dielectric constant of glasses. More particularly it relates to a method for increasing the dielectric constant of glasses used in capacitor manufacture which contain titanium ions by the addition of cerium ions. This application is a continuation-in-part of our co-pending application Serial No. 493,311, filed March 9, 1955, now abandoned.

In the manufacture of capacitors, glass has been found desirable for use as a dielectric material because of its relatively high dielectric constant which is also relatively invariant with frequency. It has heretofore been found possible to increase the dielectric constant of glass by adding a "modifier" to the material from which the glass is made, thus obtaining maximum capacity in a given volume. In the manufacture of certain types of capacitors, the glass dielectric should be capable of being drawn into filamentary form, which requires that it soften at high temperatures and have a slow change in viscosity with temperature. To be useful as a dielectric material, the glass should also be stable, i.e. resist devitrification (crystallization) and be chemically durable, i.e. resist attack by moisture.

The addition of lead and titanium ions to glasses to be used in capacitors, by the addition of lead and titanium containing compounds to the materials from which the glasses are made, increases their dielectric constant. However, these materials have certain disadvantages if the glass is to be used in capacitors of the type which require the dielectric material to be drawn into a filament. Lead ions reduce the chemical durability and lower the softening point and the viscosity of the glass at high temperatures, thus rendering glasses containing a large percentage of lead ions difficult to draw into filamentary form. The addition of titanium ions to the glass increases the durability of the glass, while their effect on the softening point is controlled by the base glass composition. However, when glasses are made from materials which contain more than about 40% by weight of titanium dioxide, the glass is found to be unstable and crystallizes very readily. Hence glasses containing 40% by weight of titanium dioxide are said to be "saturated" with titanium ions. Lead and titanium ions may be used to obtain glasses with high dielectric constants; thus, lead ions are added, usually in the form of lead oxides, until further addition would unduly lower its softening point and the chemical durability. To increase the dielectric constant still further, titanium dioxide may be added up to about 20%; more than this makes for instability of the drawn filament. This technique produces glasses capable of being drawn in filamentary form with dielectric constants in a range of about 8.5 to 10 depending upon base glass composition. Prior to the method of this invention, these were the highest dielectric constants which could be obtained in stable glasses in a filamentary form.

Accordingly, it is an object of this invention to provide a method for increasing the dielectric constant of glasses which are to be drawn in filamentary form. Another object is to provide a method for increasing the dielectric constant of glasses containing titanium ions. Another object of this invention is to provide a method of the above character for maximizing the dielectric constant of glasses which are saturated with titanium ions. Still another object of this invention is to use the above method to provide a titanium ion-containing glass having a higher dielectric constant than heretofore obtainable. A final object is to provide a glass saturated with titanium ions whose dielectric constant has been maximized by the addition of cerium ions. Other objects of the invention will in part be obvious and will in part appear hereinafter.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

In general, we have discovered that by the addition of cerium ions to glasses containing titanium ions, an increase in the dielectric constant of the glasses can be obtained which is impossible of achievement with the titanium ions. When the glass is saturated with titanium ions so the addition of further titanium ions causes devitrification, we have found that the addition of a small percentage of cerium ions in a very narrow range will cause a large increase in the dielectric constant of the glass.

Glasses are prepared by melting together their various constituents and their chemical compositions are usually specified in terms of percentage (by weight) of the total mass. The melting of such glass constituents results in the formation of a skeleton or basic structure which is a distorted network of cations, e.g. silicon ions bonded to one another by oxygen ions. A further discussion of the crystal structure of glasses appears in an article by W. E. Hauth, Jr., "The Crystal Chemistry of Glass," American Ceramic Society Bulletin, June 1951, and reference may also be made to W. H. Zachariasen, "Atomic Arrangement in Glass," 54 Journal of the American Chemical Society 3941–51 (1932). Each silicon or similar ion is surrounded by four oxygen ions, and since these silicon ions form the basic network of the glass, they are called "network formers." Certain cations are too large to enter the network, e.g. alkali and alkali earths, and these ions exist in the open "holes" in the network. In so doing they disrupt some of the bonds between the silica and oxygen and thereby modify the properties of the glass. Such cations are called "network modifiers." Lead ions are in most cases modifier ions and cause low softening temperatures and reduction in viscosity at elevated temperatures as previously noted. It is not clear whether titanium ions are network formers or network modifiers but it is believed that some titanium ions are capable of replacing silicon in the network.

The materials used to make glasses are in general oxides, but the exact form in which they are introduced is of minor importance in most glasses. They may be introduced as nitrates, oxalates or other chemical compounds. The basic material from which glass is made is silica ($SiO_2$) to which may be added potash ($K_2O$) to modify the properties of the glass for drawing. Similarly, sodium oxide and calcium oxide may also be added as modifiers. Lead ions may be added to increase the dielectric constant of the glass and otherwise modify the glass properties. These ions are usually added in the form of lead oxide, and a glass containing 70% silica, 25% potash and 5% lead oxide will have a dielectric constant of about 6.9.

Whether or not glasses contain lead, their dielectric constant and refractive index may be increased by the addition of titanium ions, usually in the form of titanium dioxide up to approximately 40% by weight. More titanium ions cause the glass to devitrify. Where 40% of titanium dioxide is added to a glass composition such as described above, proportionately reducing the amount of silica, the dielectric constant will increase from 6.9 to 10.8. The addition of titanium ions to non-lead containing glasses has a corresponding effect. When maximum amounts of lead and titanium ions have been added, it is possible to increase the dielectric constant of the glass further by the addition of cerium ions. However, the addition of cerium ions to non-titanium containing glasses has no significant effect on dielectric constant. If the glass is not saturated with titanium ions, amounts of cerium dioxide or other cerium containing compounds may be added to the glass until the cerium ions begin to cause glass vitrification. When glasses are made with material containing about 5% of titanium dioxide, up to 30% of cerium dioxide may be added, while if the glasses contain 20% titanium dioxide, between 12 and 20% of cerium dioxide may be added; glasses which are saturated with titanium ions may take only 5%. of cerium dioxide without devitrification. The increase in dielectric constant with the addition of cerium ions to the glass, is not a linear relationship but particular amounts of cerium will cause a greater increase than other amounts. In some cases increased amounts of cerium ions may cause a slight decrease. However, the general slope of the curve of dielectric constant plotted as a function of percent of cerium dioxide in the materials from which the glass is made has a positive slope, indicating that in general an increase in the amount of cerium dioxide will cause an increase in glass dielectric constant. Glasses saturated with titanium ions behave as follows: as the percentage of cerium dioxide in the glass making material is increased from none to approximately 3% there is very sharp rise in the dielectric constant. In one glass which was tested, the increase was about 15%. However, when cerium dioxide is added beyond 3%, the dielectric constant decreases very sharply and beyond 5% the glass devitrifies. At 5% the dielectric constant is only about 3% greater than before addition of any cerium ions. Thus, for glasses saturated with titanium ions, the addition of cerium ions causes a very marked increase in the dielectric constant up to the point where cerium dioxide constitutes about 3% by weight of the glass making material. For unsaturated glasses, there are a plurality of such peak values as the percentage of cerium dioxide is increased, but the peaks are not as sharp as that described for saturated glasses.

Our invention is illustrated by the following examples but not, however, so limited. Examples I and II illustrate the increase in dielectric constant obtained by adding cerium dioxide to the materials from which glasses are made, the amount of titanium dioxide being less than the amount necessary to saturate the glass. In both of these examples the glasses contain lead ions. Example III illustrates the addition of cerium ions to non-saturated non-lead containing glasses, while Example IV illustrates the effect of adding cerium ions in different amounts to a glass saturated with titanium ions.

*Example I*

Unsaturated titanium and lead-containing glasses were prepared from batches of materials having the percentage compositions (by weight of the oxide) shown in the following table. Each of the constituents was originally in the form of the oxide except the potassium which was in the form of potassium carbonate, commercially called potash. The dielectric constant of each glass was measured by making a capacitor from the glass and the measured dielectric constant is tabulated beside the glass composition below. The dielectric constant of a glass without any cerium ions is shown for purposes of comparison. Beyond 30% of cerium dioxide the glass devitrifies.

| Glass No. | Percent of $TiO_2$ | Percent of $SiO_2$ | Percent of PbO | Percent of $K_2O$ | Percent of $CeO_2$ | Dielectric Constant |
|---|---|---|---|---|---|---|
| 1 | 5 | 56 | 15 | 24 | 0 | 8.14 |
| 2 | 5 | 55 | 15 | 24 | 1 | 8.01 |
| 3 | 5 | 53 | 15 | 24 | 3 | 8.3 |
| 4 | 5 | 51 | 15 | 24 | 5 | 8.76 |
| 5 | 5 | 48 | 15 | 24 | 8 | 8.64 |
| 6 | 5 | 46 | 15 | 24 | 10 | 9.2 |
| 7 | 5 | 44 | 15 | 24 | 12 | 8.93 |
| 8 | 5 | 36 | 15 | 24 | 20 | 9.67 |
| 9 | 5 | 26 | 15 | 24 | 30 | 10.16 |

To make any of the above glasses, the ingredients, in powdered form, were thoroughly mixed together and the mixture was placed in a crucible of a refractory material such as fused silica or alumina. The crucible was then placed in a furnace and brought up to a temperature of approximately 2500° F. The mixture was left in the furnace for a period of approximately 6 hours which was sufficient to melt the constituents and permit the exclusion of any undesirable gases which were formed during the melting. The crucible was then removed from the furnace and the melted glass was poured into molds of the desired shape on a hot plate maintained at a temperature of 300° C. For test purposes, the glasses were molded into circular disks of approximately one inch in diameter and ¼ inch in thickness. When the disks had cooled sufficiently for the glass to be rigid, the disks were annealed to remove stresses in the glass. Although there are many annealing schedules which could be used to properly anneal the glasses, the following schedule was found to be satisfactory. The disks were placed in a furnace which was heated and maintained at a temperature of between 1000° F. and 1200° F. for approximately four hours and then the furnace was turned off and allowed to cool. After approximately 18 hours, the furnace reached room temperature and the disks were removed therefrom. Each of the disks was made into a capacitor by grinding flat the faces thereof and coating the faces with a conductive metal, such as silver.

*Example II*

Unsaturated titanium and lead-containing glasses were prepared from batches of materials having the percentage compositions (by weight) shown in the following table with the percentage of titanium dioxide in each of the glasses being held constant at 20%. The glasses were all made in the same manner as described in Example I above except that the mixture of the constituents of the glasses were melted at a temperature of approximately 2400° F. The dielectric constants of the glasses were measured in the same manner as previously described. The dielectric constant of the glass without any cerium ions is shown for purposes of comparison. This glass devitrified when more than 12% cerium dioxide was added.

| Glass No. | Percent of $TiO_2$ | Percent of $SiO_2$ | Percent of PbO | Percent of $K_2O$ | Percent of $CeO_2$ | Dielectric Constant |
|---|---|---|---|---|---|---|
| 1 | 20 | 41 | 15 | 24 | 0 | 9.06 |
| 2 | 20 | 40 | 15 | 24 | 1 | 9.50 |
| 3 | 20 | 38 | 15 | 24 | 3 | 9.50 |
| 4 | 20 | 36 | 15 | 24 | 5 | 9.83 |
| 5 | 20 | 33 | 15 | 24 | 8 | 9.89 |
| 6 | 20 | 30 | 15 | 24 | 10 | 10.7 |
| 7 | 20 | 29 | 15 | 24 | 12 | 10.61 |

*Example III*

Unsaturated titanium containing glasses which contained no lead or potash was prepared from batches of materials having the percentage composition (by weight) shown in the following table. Each of the constituents was originally in the form of the oxide except the sodium and calcium were each in the form of carbonates.

The glasses were made in the same manner and under the same conditions as described in Example I above. The dielectric constants of the glasses were measured as described above and are tabulated beside the glass composition. The dielectric constant of the glass without the addition of any cerium ions is shown for purposes of comparison. The addition of cerium dioxide beyond 20% by weight causes devitrification.

| Glass No. | Percent of $TiO_2$ | Percent of $SiO_2$ | Percent of $Na_2O$ | Percent of CaO | Percent of $CeO_2$ | Dielectric Constant |
|---|---|---|---|---|---|---|
| 1 | 20 | 54 | 16 | 10 | 0 | 9.88 |
| 2 | 20 | 53 | 16 | 10 | 1 | 9.8 |
| 3 | 20 | 51 | 16 | 10 | 3 | 10.22 |
| 4 | 20 | 49 | 16 | 10 | 5 | 10.81 |
| 5 | 20 | 46 | 16 | 10 | 8 | 10.58 |
| 6 | 20 | 44 | 16 | 10 | 10 | 11.30 |
| 7 | 20 | 42 | 16 | 10 | 12 | 10.93 |
| 8 | 20 | 34 | 16 | 10 | 20 | 12.04 |

*Example IV*

Saturated titanium ion-containing glasses were prepared from batches of material having the percentage composition (by weight) shown in the following table. The glasses were made in the same manner as described in Example I above except that the mixture of the constituents of the glasses was melted at a temperature of between 2200° F. and 2300° F. and the glass disks were annealed at a temperature of between 800° F. and 1000° F. The dielectric constants were measured as described above and are tabulated beside the glass composition. The dielectric constant of the glass without the addition of any cerium ions is shown for purposes of comparison. As previously noted, more than 5% of cerium dioxide caused devitrification.

| Glass No. | Percent of $TiO_2$ | Percent of $SiO_2$ | Percent of PbO | Percent of $K_2O$ | Percent of $CeO_2$ | Dielectric Constant |
|---|---|---|---|---|---|---|
| 1 | 40 | 21 | 15 | 24 | 0 | 11.5 |
| 2 | 40 | 20 | 15 | 24 | 1 | 11.65 |
| 3 | 40 | 19 | 15 | 24 | 2 | 12.1 |
| 4 | 40 | 18 | 15 | 24 | 3 | 13.2 |
| 5 | 40 | 17 | 15 | 24 | 4 | 12.3 |
| 6 | 40 | 16 | 15 | 24 | 5 | 11.8 |

Thus we have described a method of increasing the dielectric constant of glasses which contain titanium ions. These may in addition contain lead ions to the point where the addition of further lead ions would cause the glass to be unsuitable for drawing in filamentary form, and titanium ions to the point where the glasses are saturated. This has been accomplished by adding cerium ions to the glass. We have shown that the addition of cerium ions to unsaturated titanium ions-containing glasses in general causes an increase of dielectric constant; in particular for glasses saturated with titanium ions we have shown that this increase is at a maximum, the cerium ions being added in the form of cerium dioxide, when the percentage of cerium dioxide is about 3% of the total weight of the materials from which the glasses are made. By using such methods it is possible to increase the dielectric constant of glasses to be drawn into filamentary form when further additions of lead or titanium ions are impractical because of the resulting detrimental effects described above.

It will thus be seen that the objects set forth above, among those made apparent from the preceding description are attained, and, since certain changes may be made in carrying out the above method and in the compositions set forth without departing from the scope of the invention, it is intended that all matter contained in the above description shall be interpreted as illustrative and not in a limiting sense.

It is to be understood that the following claims are intended to cover all of the generic and specific features of the invention herein described, and all statements of the scope of the invention which, as a matter of language, might be said to fall therebetween. Particularly, it is to be understood that in said claims, ingredients or compounds recited in the singular are intended to include compatible mixtures of such ingredients whenever the sense permits.

Having described our invention, what we claim as new and desire to secure by Letters Patent is:

1. A glass having a dielectric constant of at least 8 consisting by weight essentially of between 16 and 55% of silica, 24% of potash, 15% of lead oxide, between 5 and 40% of titanium dioxide and between 1 and 30% of cerium dioxide, with the amount of cerium dioxide not being over 5% when the amount of titanium dioxide is 40%, and the amount of cerium dioxide not being over 12% when the amount of titanium dioxide is 20%.

2. A glass having a dielectric constant of at least 11.5 consisting by weight essentially of between 16 and 20% silica, 15% of lead oxide, 24% of potash, 40% of titanium dioxide and between 1 and 5% of cerium dioxide.

3. The glass defined in claim 2 in which the silica is 18% by weight of the glass composition, and the cerium dioxide is 3% by weight of the composition.

4. A glass having a dielectric constant of at least 8 consisting essentially of, by weight, 26 to 55% silica, 15% lead oxide, 24% potash, 5% titanium dioxide and between 1 and 30% of cerium dioxide.

5. A glass having a dielectric constant of at least 9.5 consisting essentially of, by weight, 29% to 40% silica, 15% lead oxide, 24% potash, 20% titanium dioxide and between 1 and 12% of cerium dioxide.

6. A glass having a dielectric constant of at least 9.8 consisting essentially of, by weight, 34 to 53% silica, 16% soda, 10% lime, 20% titanium dioxide, and between 1 and 20% of cerium dioxide.

References Cited in the file of this patent

UNITED STATES PATENTS

| | | |
|---|---|---|
| 2,021,244 | Scott | Nov. 19, 1935 |
| 2,220,765 | Hirose et al. | Nov. 5, 1940 |
| 2,321,987 | Brown | June 15, 1943 |
| 2,579,709 | Smith et al. | Dec. 25, 1951 |
| 2,683,666 | Duncan et al. | July 13, 1954 |
| 2,790,723 | Stradley | Apr. 30, 1957 |
| 2,924,636 | Broderick et al. | Feb. 9, 1960 |